United States Patent [19]

Carvalho et al.

[11] Patent Number: 5,199,850
[45] Date of Patent: Apr. 6, 1993

[54] PITCH STOP ASSEMBLY FOR VARIABLE PITCH PROPULSOR

[75] Inventors: Paul A. Carvalho, Westfield; Edward H. Kusiak, Longmeadow, both of Mass.

[73] Assignee: United Technologies Corporation, Hartford, Conn.

[21] Appl. No.: 738,377

[22] Filed: Jul. 31, 1991

[51] Int. Cl.⁵ .............................................. B63H 1/06
[52] U.S. Cl. ................................... 416/153; 416/165; 416/162
[58] Field of Search ............. 416/147, 153, 154, 156, 416/157 R, 160, 159, 162, 164, 165, 46

[56] References Cited

U.S. PATENT DOCUMENTS

| | | | |
|---|---|---|---|
| 2,501,908 | 3/1950 | Nichols | 416/153 |
| 2,542,463 | 2/1951 | Beard | 92/13.1 X |
| 2,663,373 | 12/1953 | Richmond | 416/50 X |
| 2,993,542 | 7/1961 | Allen, Jr. | 416/154 X |
| 3,212,586 | 10/1965 | Barnes et al. | 170/160.24 |
| 3,722,641 | 3/1973 | Kusiak | 416/165 X |
| 3,766,798 | 10/1973 | Kusiak | 416/165 X |
| 3,893,789 | 7/1975 | Andrews | 416/160 |
| 3,922,852 | 12/1975 | Drabek | 416/162 X |
| 3,994,128 | 11/1976 | Griswold, Jr. et al. | 416/165 X |
| 4,097,189 | 6/1978 | Harlamert | 416/46 |
| 4,523,891 | 6/1985 | Schwartz et al. | 416/157 R |
| 4,533,296 | 8/1985 | Duchesnean et al. | 416/153 X |
| 4,650,402 | 3/1987 | Jones, Jr. et al. | 416/157 R |
| 4,711,615 | 12/1987 | Rusu | 416/46 |
| 4,750,862 | 6/1988 | Barnes et al. | 416/157 R |
| 4,753,572 | 6/1988 | Kusiak | 416/46 |

FOREIGN PATENT DOCUMENTS

| | | | |
|---|---|---|---|
| '1142760 | 1/1963 | Fed. Rep. of Germany | 416/154 |
| 1189862 | 3/1965 | Fed. Rep. of Germany | 416/153 |
| 3837994 | 5/1990 | Fed. Rep. of Germany | 416/160 |

Primary Examiner—Edward K. Look
Assistant Examiner—Todd Mattingly
Attorney, Agent, or Firm—William W. Habelt

[57] ABSTRACT

A pitch change system (30) for varying the pitch of the blades (16) of a multi-bladed propulsor (10) comprises a pitch change actuation assembly (40) and a pitch change drive assembly (70) for selectively actuating the pitch change actuation assembly (70) whenever it is desired to change blade pitch. The pitch change actuation assembly (40) comprises a ballscrew (42), a ballscrew nut (44) threadably mounted to the ballscrew (42), and a pitch stop assembly (100) having a retractable feather stop (135) which in its normal position prevents the ballscrew (42) from driving the ballscrew nut (44) to move the blades (16) beyond the coarse pitch setting corresponding to blade feather, but in its retracted position permits the ballscrew (42) to drive the ballscrew nut (44) to move the blades (16) through feather to a desired reverse pitch setting.

4 Claims, 4 Drawing Sheets

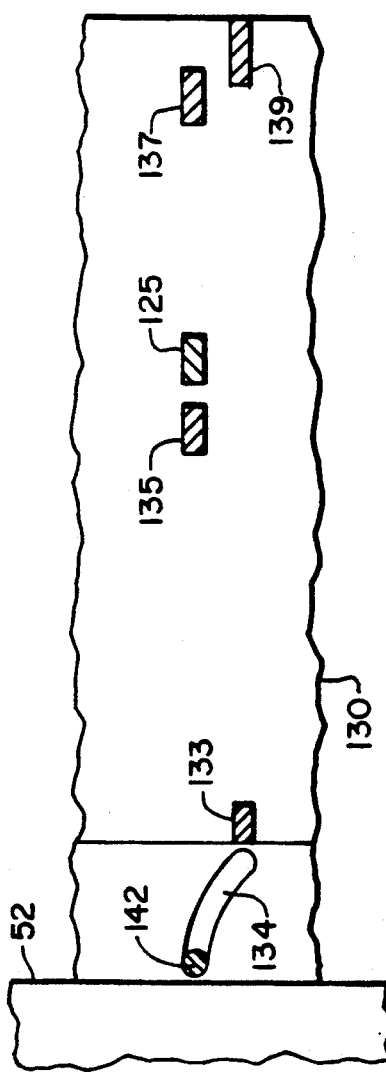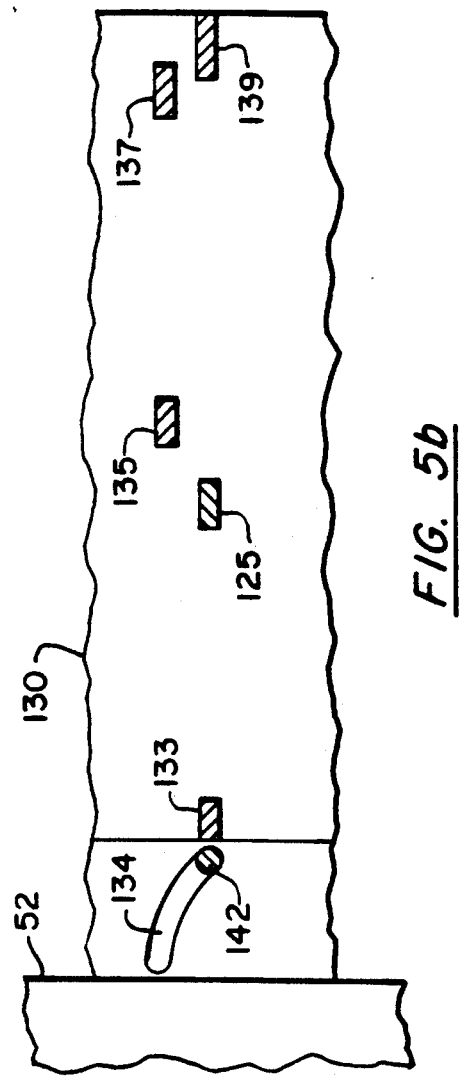

PITCH STOP ASSEMBLY FOR VARIABLE PITCH PROPULSOR

TECHNICAL FIELD

This invention relates generally to variable pitch bladed propulsors for powering aircraft and, more particularly, to a pitch change system for varying the pitch of the blades of a bladed propulsor, in particular of a multi-bladed propfan, and unducted or ducted multi-bladed fan systems for powering aircraft.

BACKGROUND ART

In typical variable blade pitch propulsor systems for aircraft engines, whether of the propeller, propfan or unducted or ducted fan type, a plurality of propulsor blades, each pivotally mounted for movement about its longitudinal axis to a rotary hub driven by the aircraft engine, are operatively connected to a blade pitch change actuator system disposed in an interior chamber defined within the hub. One type of pitch change system, commonly referred to as a rotary actuation system, is disclosed, for example, in commonly-assigned U.S. Pat. Nos. 3,876,334; 3,893,789; 3,895,884; 3,902,822, 3,904,315, 3,964,839 and 4,021,142. Another type of pitch change system, commonly referred to as a linear actuation system, is disclosed, for example, in commonly-assigned U.S. Pat. Nos. 4,753,572 and 4,936,746. In such linear systems, rotation of ballscrew actuator causes a nut threaded thereabout to translate either forwardly or rearwardly along the ballscrew depending upon the direction of rotation of the ballscrew. The ballscrew nut is integral to a surrounding yoke which is operatively connected to each of the blades through a plurality of articulating links, each of which connects to a rotatable trunnion in which a blade is mounted, such that translation of the yoke is converted to a rotation of each blade about its longitudinal axis. In both of these types of pitch change systems, the pitch change actuator has been driven by selectively activating a hydraulic or electric drive mechanism which serves to rotate the pitch change actuator relative to the rotating hub so as to effect a rotation of each the blades within its hub socket about its longitudinal axis, thereby changing the pitch setting of the blade.

As is well recognized by those skilled in the art, it is desirable in such blade pitch change actuation systems to provide a low pitch stop to limit movement in flight to a fine blade pitch below a preselected minimum, for example as might otherwise occur in the event of a malfunction in the system, and also a feather stop to prevent the blades from inadvertently passing through feather. Also, it is necessary that the pitch change system be capable of reversing blade pitch. In conventional systems, blade pitch reversal has customarily been accomplished by passing the blades through flat blade pitch. Accordingly, such conventional systems are unsuitable for use on a propulsor wherein blade pitch reversal is to be accomplished by passing the blades through feather, rather than flat pitch, such as now desired on variable pitch propulsors having a large number of blades, such as advanced ducted propulsors being considered for use on turbine driven aircraft.

DISCLOSURE OF INVENTION

It is an object of the present invention to provide a pitch change actuation system having a retractable feather stop, which when selectively retracted permits reversing blade pitch by passing the blades through feather, but when unretracted prevents inadvertent blade reversal during flight.

It is a further object of the present invention to provide a pitch change actuation system having a retractable in-flight low pitch stop, which when selectively retracted permits passing the blades to a finer pitch for ground operation, but when unretracted prevents passage of the blades to a pitch setting finer than the in-flight low pitch stop.

It is also an object of the present invention to provide a pitch change actuation system having a pitch stop at the full reverse position.

Accordingly, the pitch change actuation assembly of the present invention is selectively actuatable to cause each blade to rotate about its longitudinal axis to a finer or a coarser pitch setting and includes a pitch stop means which is selectively positionable so as to permit the blades to pass through feather when it is desired to move the blades to a reverse pitch setting.

The pitch change actuation assembly comprises a ballscrew operatively connected to the pitch change drive assembly, a ballscrew nut mounted to the ballscrew to be translatable therealong upon rotation of the ballscrew by the pitch change drive assembly, means for operatively interconnecting the ballscrew nut to each of the blades whereby a translation of the ballscrew nut causes a rotation of each blade to a new pitch setting, and a pitch stop assembly operatively associated with the ballscrew nut and having a retractable feather stop whereby the feather stop prevents the ballscrew from driving the ballscrew nut to move the blades beyond the coarse pitch setting corresponding to blade feather unless the feather stop is selectively retracted. Most advantageously, the pitch stop assembly also includes a retractable stop at the minimum desired in-flight low pitch setting whereby the ballscrew is prevented from driving the ballscrew nut to move the blades to a finer pitch beyond this setting unless the low pitch stop is selectively retracted, a fixed stop at the maximum reverse pitch setting and a fixed stop at the minimum fine pitch setting permitted during on ground operation.

The pitch change actuation assembly of the present invention is suitable for use in a pitch change system having a pitch change drive assembly which is capable of selectively rotating the ballscrew of the pitch change actuation assembly. Such a pitch change drive assembly may comprise a multi-gear drive gear train operatively connected to the ballscrew of the pitch change actuation assembly and means operative, when selectively activated, to rotate the gears of the drive gear train so as to rotate the ballscrew of the pitch change actuation assembly relative to the ballscrew nut of the pitch change actuation assembly thereby causing the ballscrew nut to translate forwardly or rearwardly along the ballscrew to effect the desired pitch change.

The foregoing and other objects, features and advantages of the present invention will become more apparent in light of the detailed description of a best mode embodiment thereof, as illustrated in the accompanying drawing.

BRIEF DESCRIPTION OF THE DRAWINGS

FIG. 5a is an enlarged plan view taken along line 5—5 of FIG. 4 with the pitch stops positioned for normal in-flight operation; and FIG. 5b is an enlarged plan view taken along line 5—5 of FIG. 4 with the pitch stops positioned for by-pass operation.

BEST MODE FOR CARRYING OUT THE INVENTION

Figure 1:
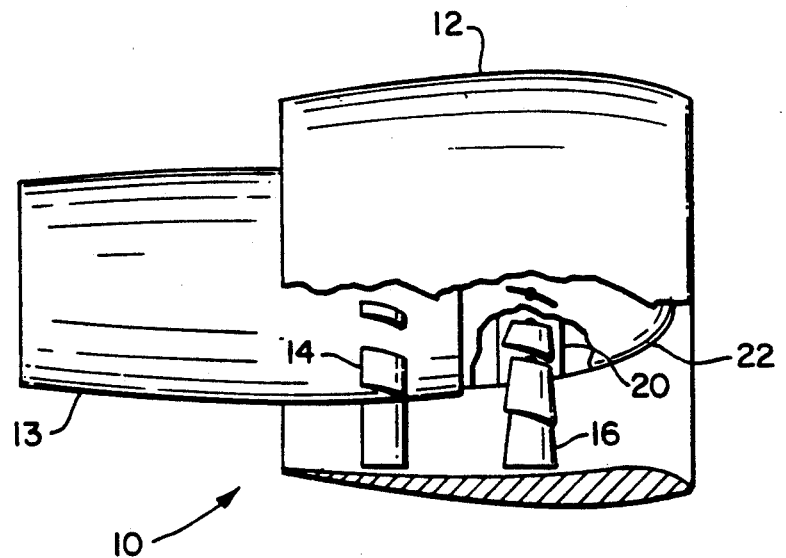
FIG. 1 is a schematic elevational view, partly sectioned, of a ducted fan propulsor type turbine engine for powering an aircraft.

The present invention is directed to a system for adjusting the pitch of the blades of a variable pitch propulsor system of the type suitable for use on propulsor driven aircraft, such as, but not limited to, a ducted fan type propulsor driven by a turbine engine as depicted in FIG. 1. The propulsor 10 is a multi-bladed fan disposed within a bypass duct 12 supported by a plurality of vanes 14 mounted to and extending radially outwardly from the engine casing 13. The propulsor 10 comprises a plurality of circumferentially spaced, radially extending, variable pitch prop-fan blades 1, typically ranging in number from 12 to 24, mounted to a disc 20 for rotation therewith. The rotatable disc 20 is disposed within the spinner 22 mounted to the forward end of the engine casing and is operatively connected to and driven in a conventional manner through a reduction gear assembly by the drive shaft of the engine, typically a turbine engine, (not shown) disposed within engine casing 13.

Figure 2:
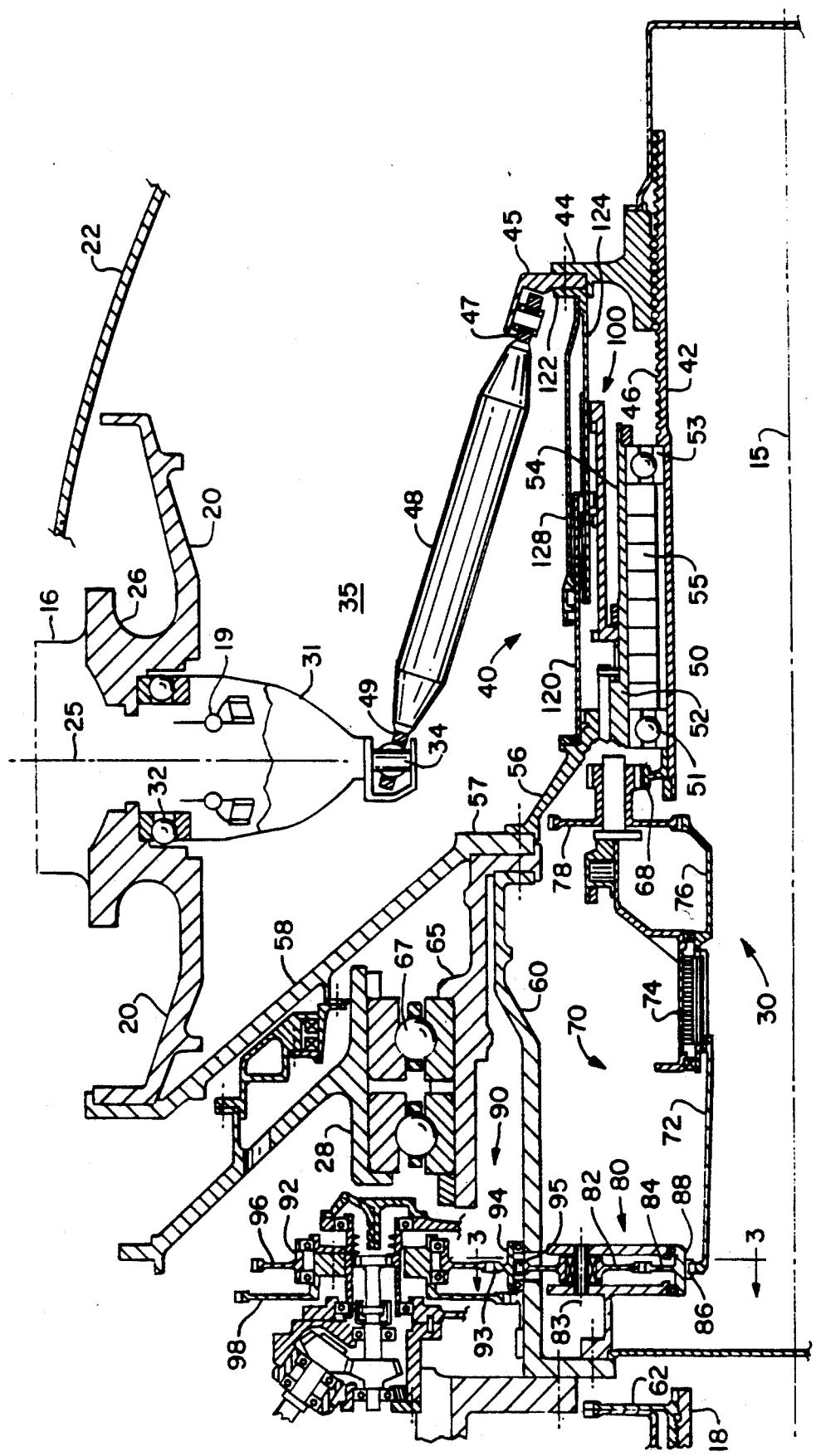
FIG. 2 is a sectional side elevational view illustrating the pitch change system of the present invention.

Referring now to FIG. 2, the ring-like disc 20 has a plurality of circumferentially spaced barrel arms 26, each of which extends radially outward from the circumferential disc ring 20 disposed co-axially about the axis 15 of the engine drive shaft 18 and is adapted to receive and retain a blade 16. Each of the blades 16 is mounted at its root portion, such as by a torque drive retention ring 19, into a cuff 31 which is rotatable on ball bearings 32 in a socket defined by a barrel arm 26 of the disc 20, whereby each blade is pivotally adjustable for pitch change about its longitudinal axis 25. The blade pitch change system 30 of the present invention is disposed within a chamber 35 defined within the interior region of the spinner 22 so as to extend co-axially through the disc 20.

The blade pitch change system 30 comprises a pitch change actuation assembly 40 operatively connected to the blades 16 and a pitch change drive assembly 70 for activating the pitch change actuation assembly 40 whenever it is desired to change blade pitch. The pitch change actuation assembly 40 comprises a ballscrew 42, a ballscrew nut 44 threadably mounted on the ballscrew 42, and a pitch stop means 100. The ballscrew 42 is disposed within the interior chamber so as to extend co-axially about the axis 15 of the engine drive shaft and the ballscrew nut 44 is threadably mounted on a threaded portion 46 of the ballscrew 42 in a conventional manner whereby a rotation of the ballscrew 42 results in a translation of the anti-rotation ballscrew nut 44 axially forward or aft along the threaded portion 46 of the ballscrew 42. Projecting radially outward from the ballscrew nut 44 is a circumferential mounting yoke 45 which is adapted to receive and operatively engage an end 47 of each of a plurality of connecting members 48, the other end 49 of each connecting member 48 being secured to a pin 34 extending eccentrically to the pitch change axis from the cuff 30 retaining the root portion of a blade 16, there being one connecting member 48 operatively associated with each blade 16.

The ballscrew 42 also has an annular cylindrical portion 50 which extends axially rearwardly from the threaded portion 46 of the ballscrew and provides a bearing surface for supporting the ballscrew 42 within a pair of axially spaced circumferential support bearings 51 and 53 which are mounted within a cylindrical sleeve portion 54 of a support member 52 which extends in spaced relationship about and coaxially along the cylindrical portion 50 of the ballscrew 42. The support member 52 is connected to the propulsor disc 20 through a flange-like portion 56 of the support member 52 extending outwardly from the aft end of the cylindrical sleeve portion 54 of the support member 52 and a conical linking member 58 which is mounted at its inner flange 57 to the flange-like portion 56 of the support member 52 and at its outer flange to the propulsor disc 20.

Disposed coaxially about the ballscrew 42 and interconnecting the flange-like portion 56 of the support member 52 with the yoke 45 is an anti-torque tube assembly comprising a first cylindrical sleeve 120 connected to the flange-like portion 56 of the support member 52 and extending forwardly therefrom in a cantilevered fashion coaxially about the axis 15 to be received about a second cylindrical sleeve 124 which is mounted at its annular base flange 122 to the ballscrew nut 44 and extends rearwardly therefrom in cantilevered fashion coaxially about the axis 15. The cylindrical sleeves 120 and 124 mate in telescoping fashion and are operatively interconnected by a spline and quill arrangement such that relative rotation therebetween is precluded, but relative axial translation therebetween is permitted. A cylindrical guide tube 128 also extends rearwardly from the base flange 122 in a cantilevered manner coaxially about and spaced radially outwardly from the sleeve 124 to receive the forward end of the forwardly extending sleeve 120. The anti-torque tube assembly ensures that the nut 44 will rotate with the support member 52 and not rotate with the ballscrew 42 when the ballscrew 42 is selectively rotated to effect a pitch change, since the cylindrical sleeves 120 and 124 cannot rotate relative to each other. However, as the sleeves 120 and 124 may translate relative to each other, the relative rotation of the ballscrew 42 and the ballscrew nut 44 causes the ballscrew nut 44 to translate, with the cylindrical sleeve 124, along the ballscrew 42 to effect the desired pitch change.

The inner flange 57 of member 58 and the flange-like portion 56 of the support member 52 are also connected to an engine output shaft 60 for rotation therewith. The engine output shaft 60 is driven in rotation by the engine drive shaft 18, through a sun gear 62 mounted to the engine drive shaft 18 and operatively interconnected, for example by means of any suitable conventional reduction gearing assembly (not shown), to the engine output shaft 60, at the rotational speed, i.e. revolutions per minute, at which it is desired to rotate the blades 16. Thus, while supporting the ballscrew 42, the support member 52 also rotates with the propulsor disc 20 and the blades 16 mounted thereto about the axis 15 of the engine shaft 18. This entire rotating assembly is supported for rotation by means of a cylindrical support member 65 which is mounted at its forward end to the engine output shaft 60, the linking member 58 and the support member 52 and extends axially rearwardly therefrom to be received in supporting relationship within an annular stationary support sleeve 28, wherein the support member 65 is supported by means of annular support bearings 67 for rotation about the engine shaft axis 15.

To effect a pitch change, the ballscrew 42 is driven by means of the pitch change drive assembly 70 to rotate relatively to the engine output shaft 60 that is driven by the engine drive shaft 18 and which rotates the propulsor disc 20. To facilitate rotation of the ballscrew 42, a cylindrical ring gear 68 is mounted, e.g. splined, to the cylindrical portion 50 of the ballscrew 42. The pitch change drive assembly 70 comprises a drive gear train 80 including a ballscrew drive gear 88 which drives the ballscrew ring gear 68, and a selectively activable means 90 for driving the ballscrew drive gear train 80 to drive the ballscrew drive gear 88 as will be in further detail hereinafter. Although the ballscrew drive gear 88 may be directly meshed with the ring gear 68, the pitch change drive assembly desirably includes a no back gear train for operatively connecting the ballscrew drive gear 88 to the cylindrical ring gear 68 mounted to the ballscrew 42.

Advantageously, the no back gear train 72 comprises a conventional no back spring assembly 74 disposed coaxially about the axis 15 intermediate the ballscrew drive gear 88 and the ring gear 68 mounted to the ballscrew 42, a first splined member operatively interconnecting the ballscrew drive gear 88 to the rearward end of the no back spring assembly 74, a ballscrew sun gear 76 operatively interconnected to the forward end of the no back spring assembly 74, and at least one planetary gear 78 operatively interconnecting the ballscrew sun gear 76 with the ring gear 68 mounted to the ballscrew 42. Typically, three planetary gears 78 circumferentially spaced at 120 degree intervals about the ring gear 68 are provided for transmitting rotational drive from the ballscrew sun gear 76 to the ring gear 68 for rotating the ballscrew 42. The no back spring assembly 74 operates as a rotary pitch lock means for locking the ballscrew 42 from rotating except when driven via the ballscrew drive gear 88, thus preventing the twisting moments imposed upon the blades during operation from rotating the ballscrew 42 and thus causing the nut 44 to translate thereby undesirably rotating the blades away from the last desired pitch setting.

During normal operation, i.e. whenever a pitch change maneuver is not being executed, the gear train drive means 90 is not activated and, therefore, the ballscrew 42 merely rotates synchronously with the support member 52 and the propulsor disc 20, together with the blades 16 mounted thereto. However, as will be discussed further hereinafter, when gear train drive means 90 is activated, the ballscrew drive gear train 80 will be driven to rotate the ballscrew drive gear 88 which in turn drives the ring gear 68 such that the ballscrew 42 rotates relatively to the support member 52 and the propulsor disc 20, thereby causing the ballscrew nut 44 to translate axially, forward or aft, along the threaded portion 46 of the ballscrew 42, dependent upon the direction of rotation of the ballscrew 42, thereby pushing or pulling each of the eccentric pins 34 by means of the connecting members 48 thus causing each blade 16 to rotate within its barrel arm 26 to a new pitch setting. Means, such as a mechanical spring pack 55, is coaxially disposed within the sleeve 54 to extend between the ballscrew support bearings 51 and 53 for absorbing the axial stop loads imposed upon the system due the inertia of the pitch change drive train. When a pitch stop is engaged, thereby stopping translation of the ballscrew nut 44 and yoke 45, the ballscrew 42 will continue to rotate under its own inertia, thereby compressing the spring pack until the energy is absorbed.

The means 90 for driving the gear train 80 comprises a selectively activable drive means 92 and a cylindrical rotor 94 operatively associated with and driven by the drive means 92 when the drive means 92 is selectively activated, for example by hydraulic motor or an electric motor (not shown) in a conventional manner. Although depicted herein as a differential gear drive means, it is to be understood that the drive means 92 may comprise any suitable means for selectively rotating the cylindrical rotor 94 relative to the engine output shaft 60, including but not limited to electrically or hydraulically activated motors or drive systems.

The differential gear drive means 92 is stationarily disposed and supported on the stationary side of the propulsor hub, while the rotor 94 is supported for rotation on annular bearing rings disposed between the rotor 94 and the engine output shaft 60 and extends circumferentially about the engine output shaft 60. The rotor 90 has an outer ring of gear teeth 93 extending about its radially outward facing circumferential surface and an inner ring of gear teeth 95 extending about its radially inward facing circumferential surface. The differential drive gear means 92 has a drive gear 96 and a driven gear 98. The teeth of the drive gear 96 of the differential drive gear means 92 intermesh in driving relationship with the outer ring of teeth 93 of the rotor 94 and the teeth of the driven gear 98 intermesh with the engine output shaft 60 whereby the driven gear 98 is rotatably driven by the engine output shaft 60 at the same rotational speed as the engine output shaft 60.

Figure 3:
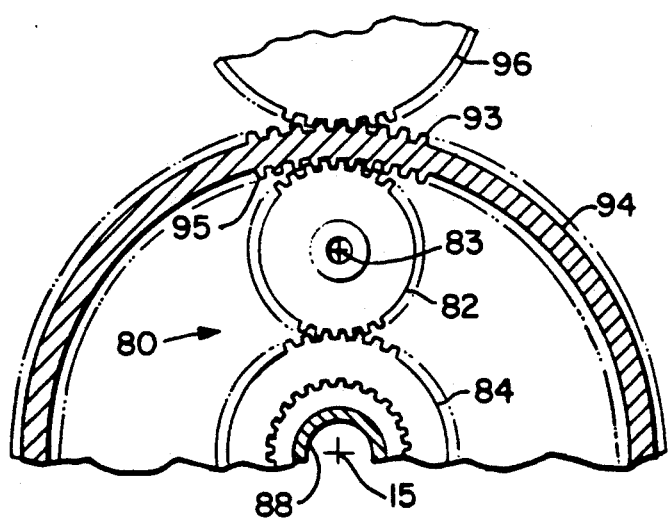
FIG. 3 is a section view taken along line 3—3 of FIG. 2.

The gear teeth 95 on the radially inwardly facing surface of the rotor 94 operatively interconnect the rotor 94 in driving relationship with the ballscrew drive gear train 80 of the pitch change drive assembly 70. The ballscrew drive gear train 80 comprises a feed-thru gear 82 and the ballscrew drive gear 88 which comprises ring gear means having an elongated annular body disposed coaxially with the engine shaft axis 15, toothed ring gear 84 extending radially outwardly therefrom and an inner spline 86 disposed on the radially inward surface of the annular body of the drive gear 88 for transmitting rotary drive input to the ballscrew ring gear 68. As illustrated in FIG. 3, the toothed ring gear 84 extends radially outwardly from the annular body of the drive gear 88 to intermeshes with feed-thru gear 82 which in turn intermesh with the gear teeth 95 of the rotor 94.

In operation, the drive means 92 is not activated unless it is desired that the pitch of the blades 16 be changed. In that event, the drive means is selectively activated so as to rotate the rotor 94 relative to the engine output shaft 60. During normal operation, that is when a pitch change is not being effected, the drive gear 96 of the differential gear drive means 92 drives the rotor 94 at the same speed as the engine output shaft 60. As the rotor 94 and the engine output shaft 60 are both rotating at the same rpm, the feed-thru gear 82 is not rotating about its axis 83 and thus no pitch change occurs. However, when the drive means 92 is activated, such as by an electric motor or a hydraulic motor (not shown) also located in the stationary region of the propulsor, the rotational speed of the drive gear 96 of the drive means 92 is either increased or decreased relative to the rotational speed of the driven gear 98 of the differential gear drive means 92, the driven gear 98 always rotating at the same rotational speed as the engine output shaft 60. When the drive gear 96 changes its rotational speed, it operates to drive the rotor 94 to rotate either at a slower rpm than the engine output shaft 60 or at a faster rpm than the engine output shaft 60, depending upon whether it is desired to effect a change to a finer pitch or a coarser pitch.

For example, if the rotor 94 slows down relative to the engine output shaft 60, the resultant relative rotation of the rotor 94 with respect to the gear train 80, which rotates with the engine output shaft 60, about the engine axis 15, causes the feed-thru gear 82 to rotate about its axis 83 in a clockwise direction. The feed-thru gear 82, which also intermeshes with the ring gear 84 of the ballscrew drive gear 88, in turn drives the ballscrew drive gear 88. As the ballscrew drive gear 88 rotates relate to the engine output shaft 60, the ballscrew 42 being driven through the ballscrew drive gear 88, while rotating in the same direction as the ballscrew nut 44 which is driven through the engine output shaft 60, rotates at a faster speed than the ballscrew nut 44. The resultant relative rotation between the ballscrew 42 and the ballscrew nut 44 causes the ballscrew nut 44 to translate axially rearward along the threaded portion of the ballscrew 42, thereby driving the blades 16 to a coarser pitch setting.

On the other hand, when the drive means 92 is actuated so as to cause the drive gear 96 to rotate the rotor 94 at a faster rpm than the engine output shaft 60, the resultant relative rotation of the rotor 94 with respect to the gear train 80 about the engine axis 15, causes the feed-thru gear 82 to rotate about its axis 83 in a counterclockwise direction. The feed gear 82, which also intermeshes with the ring gear 84 of the ballscrew drive gear 88, in turn drives the ballscrew drive gear 88 in the opposite direction. As the ballscrew drive gear 88 rotates relate to the engine output shaft 60, the ballscrew 42 being driven through the ballscrew drive gear 88, now rotates in the opposite direction of the ballscrew nut 44 which is driven through the engine output shaft 60. The resultant relative rotation between the ballscrew 42 and the ballscrew nut 44 causes the ballscrew nut 44 to translate axially forward along the threaded portion of the ballscrew 42, thereby driving the blades 16 to a finer pitch setting.

On variable pitch propulsors having a relatively large number of blades, such as the ducted propfan type propulsor 10, the blades 16 must be capable of being set at pitch settings ranging from a very low blade pitch angle, such as 38 degrees at the Beta ⅜ position on the blade, when the aircraft is taxiing on the ground so as to minimize forward thrust at the engine's ground idle speed to a relatively high blade pitch angle, such as 164 degrees at the Beta ⅜ position on the blade, when it is desired to reverse the propulsor blades. However, it is desirable to limit the minimum fine pitch angle at which the blades may be set during flight to a low blade pitch angle which is greater than the minimum angle at which the blades may be positioned during taxiing. Additionally, due to the relatively large number of blades on typical propfan or fan propulsors, ducted or unducted, it is necessary to go through feather, i.e. maximum coarse pitch, when it is desired to reverse blade pitch.

Figure 4:
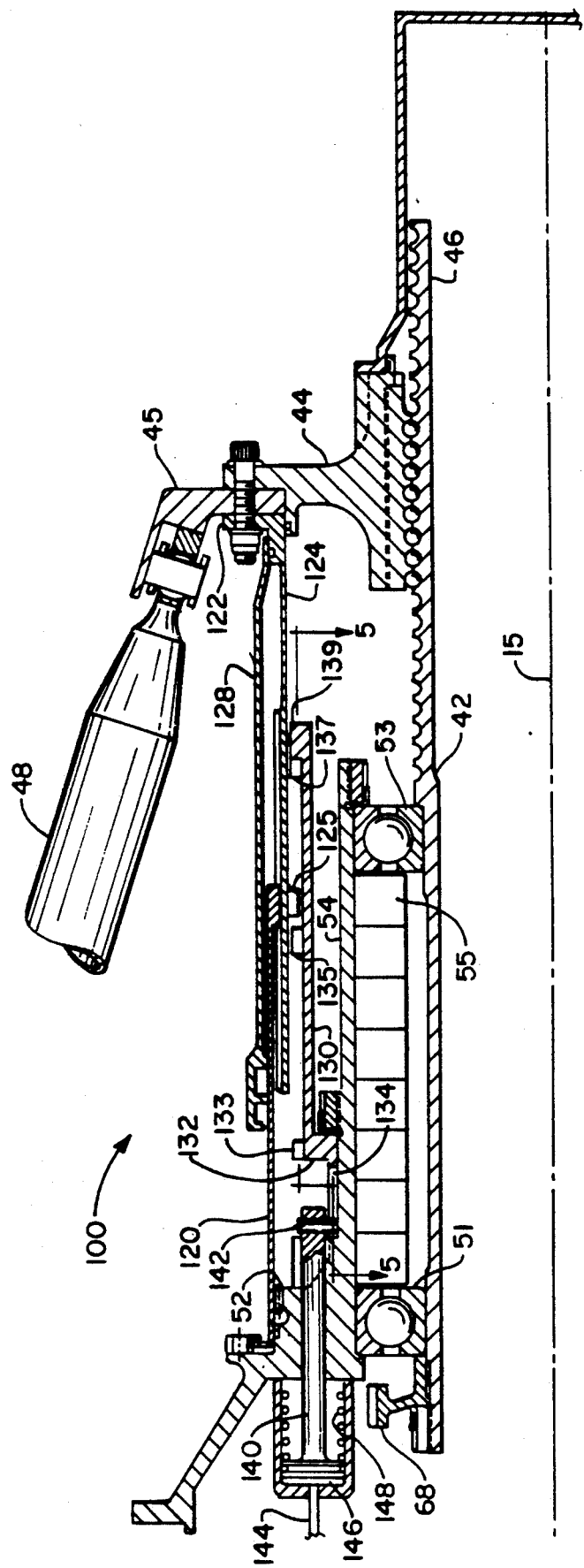
FIG. 4 is an enlarged view of the pitch change actuation assembly of the pitch change system illustrated in FIG. 2.

Accordingly, the pitch change actuation assembly 40 of the present invention incorporates a pitch stop assembly 100 which provides not only hard stops at the minimum ground low blade pitch setting and at the reverse blade pitch setting, but also retractable stops at the blade feather pitch setting and at the minimum flight low blade pitch setting. Referring now to FIG. 4, the pitch stop assembly 100 comprises an elongated and rotatable stop cylinder 130 extending into the rearwardly extending anti-torque sleeve 124, a stop lug 125 extending radially inwardly from the anti-torque sleeve 124, and means 140 for rotating the stop cylinder 130 about the axis 15 through a fixed angle relative to the anti-torque sleeve 124.

The elongated stop cylinder 130 is slideably disposed about the sleeve 54 of the ballscrew support member 52 and supported therefrom at its base end 132 so as to extend forwardly coaxially about and spaced outwardly from the ballscrew 42, but spaced inwardly of the anti-torque sleeve 124. That is, the stop cylinder 130 extends within the annular cavity defined within the anti-torque sleeve 124. Four stop lugs 133, 135, 137, 139 are mounted along the exterior surface of the stop cylinder 130 at axially spaced intervals so as to extend radially outwardly therefrom toward the anti-torque sleeve 124. These four stop lugs are axially spaced apart at preselected intervals so as to selectively engage the stop lug 125 extending radially inwardly from the anti-torque sleeve 124. When the stop lug 125 engages any one of the lugs 133, 135, 137 or 139, further axial translation of the ball nut is precluded.

In order to provide for rotation of the stop cylinder 130 through a fixed angle relative to the anti-torque sleeve 124, a plurality, typically three, of hydraulically actuated, spring-loaded pistons 140 are circumferentially spaced about and mounted to the aft end of the ballscrew support member 52 at circumferentially spaced intervals thereabout. Each piston 140 is operatively connected to the stop cylinder 130 by pin means 142 which passes through the piston and is received into a helical slot 134 cut into the base end 132 of the stop cylinder 130. Thus, the stop cylinder 130 is restrained from rotating from its normal operating position relative to the anti-torque sleeve 124, as illustrated in FIG. 5a, except when the pistons 140 are actuated. Upon actuation of the pistons 140 by selectively delivering a pressure fluid from a control valve (not shown) through a supply conduit 144 against the head 146 of each piston 140, the pistons move synchronously forward against the force of springs 148 thereby translating the pin means 142 forwardly within the helical slots 134. The movement of pin means 142 in the helical slots 134 causes the stop cylinder 130 to rotate relative to the anti-torque sleeve 124 through the desired angle to its bypass position as illustrated in FIG. 5b. When the pressure signal imposed upon the head of each piston 140 is released, the springs 148 drive the pistons 140 rearwardly to their fully retracted position, thereby translating the pin means 142 rearwardly within the helical slots 134, thus causing the stop cylinder 130 to rotate back to its normal position.

In operation the stop lug 133 at the rearward end of the stop cylinder 130 serves as a reverse pitch limit stop to prevent the ballscrew/ball nut assembly from moving the blades 16 past a preselected maximum allowable reverse blade pitch angle and the stop lug 139 at the forward end of the stop cylinder 130 serves as a minimum low pitch limit stop to prevent the ballscrew/ball nut assembly from moving the blades 16 past a preselected minimum allowable low pitch angle during ground operation. Both the rearward stop lug 133 and the forward stop lug 139 are fixed pitch stops, that is, they can not be selectively bypassed to permit movement of the blades through the pitch angles corresponding thereto. Disposed intermediate the fixed stop lugs 133 and 139 are the two selectively bypassable stop lugs 135 and 137. The stop lug 135 serves as a feather limit stop which, unless bypassed, serves to stop the movement of the blades to a coarser pitch than feather, i.e. the maximum allowable flight blade pitch. The feather stop lug 135 is selectively bypassed when it is desired to move the blades 16 to a reverse pitch setting. The stop lug 137 serves as an in-flight limit stop which, unless bypassed serves to stop the movement of the blades to a finer pitch than a preselected minimum allowable flight low blade pitch thereby precluding the blades from inadvertently going into an overspeed condition. The overspeed stop lug 137 is selectively bypassed when it is desired to move the blades 16 to a lower pitch angle when on the ground.

As noted hereinbefore, the stop cylinder 130 may be selectively rotated through a limited angle relative to the anti-torque sleeve 120 via the pistons 140. The pistons 140 are actuated by applying a pressure signal to the piston head 146 to cause a desired rotation of the stop cylinder 130 whenever it is desired to either bypass the feather stop lug 135 in order to pass through feather to go to a reverse pitch blade setting or bypass the overspeed stop lug 137 during ground operation to go to a finer pitch blade setting. In either case, when the pistons 140 move axially forward, each pin means 142 translates forwardly in its helical slot 134 thereby causing the stop cylinder 130 to rotate relative to the anti-torque sleeve 122 thereby rotating the stop lug 135 or 137, as the case may be, away from the stop lug 125, whereby the ball nut assembly may then continue to translate thus driving the blades 16 through feather to a coarser pitch or through minimum flight pitch to the lower minimum ground pitch setting.

Although the invention has been shown and described with respect to a particular embodiment thereof, it should be understood by those skilled in the art that the foregoing and various other changes, omissions, and additions in the form and detail thereof may be made therein without departing from the spirit and scope of the invention.

We claim:

1. A pitch change system for changing blade pitch on a variable pitch propulsor having a rotatable disc and a plurality of blades mounted to the disc for rotation therewith, each blade further being selectively rotatable about its longitudinal axis for pitch change, said pitch change system comprising a pitch change actuation assembly including a ballscrew being relatively rotatable with respect to the propulsor disc, a ballscrew nut operatively connected to the blades of the propulsor disc and threadably mounted on the ballscrew so as to rotate with the propulsor disc and axially translate along the ballscrew in response to a relative rotation between the ballscrew and the propulsor disc; and a pitch stop assembly; and a pitch change drive assembly operatively associated with the ballscrew of the pitch change actuation assembly for selectively rotating the ballscrew relative to the propulsor disc, said pitch change system characterized in that the pitch stop assembly of the pitch change actuation assembly comprises:

a first stop means having ballscrew nut stop means associated therewith, said first stop means rotating and translating with the ballscrew nut;

second stop means mounted for rotation with the propeller disc, said second stop means having a reverse pitch stop means, a feather pitch stop means, an overspeed pitch stop means and a minimum low pitch stop means associated therewith, said second stop means disposed in operative relationship with said first stop means whereby translation of the ballscrew nut relative to the ballscrew is precluded upon engagement of said ballscrew nut stop means with any one of said pitch stop means of said second stop means; and means for selectively rotating said second stop means relative to said first stop means whereby said ballscrew nut stop means may selectively bypass at least one of said feather pitch stop means and said overspeed pitch stop means.

2. A pitch change system as recited in claim 1 wherein said second stop means may be selectively rotated relative to said first stop means whereby said ballscrew nut stop means may selectively bypass said feather pitch stop means thereby permitting the blades to pass through feather pitch to reverse pitch.

3. A pitch change system as recited in claim 1 wherein said second stop means may be selectively rotated relative to said first stop means whereby said ballscrew nut stop means may selectively bypass said overspeed pitch stop means thereby permitting the blades to pass through the overspeed pitch to a lower pitch.

4. A pitch change system as recited in claim 1 wherein:

said ballscrew nut stop means comprises a first cylindrical member mounted at one end to said ball nut and having a sleeve portion extending axially therefrom, the sleeve portion of said first cylindrical member having a stop lug extending radially therefrom; and said second stop means comprises an axially elongated second cylindrical member supported at one end for rotation with said propeller disc and having a sleeve extending axially therefrom and engaging the sleeve portion of said first cylindrical member in sliding relationship, the sleeve portion of said second cylindrical member having a reverse pitch stop lug, a feather pitch stop lug, an overspeed pitch stop lug, and a minimum low pitch stop lug extending radially therefrom at axially spaced intervals therealong, the stop lug of said first cylindrical member arranged to engage each of the reverse pitch, feather pitch, overspeed pitch, and minimum low pitch stop lugs of said second cylindrical member at a preselected blade pitch setting associated therewith.

* * * * *